April 22, 1958  H. CHIOPELAS ET AL  2,831,530
AUTOMOBILE DRIVER'S HEADREST
Filed May 20, 1954  2 Sheets-Sheet 1
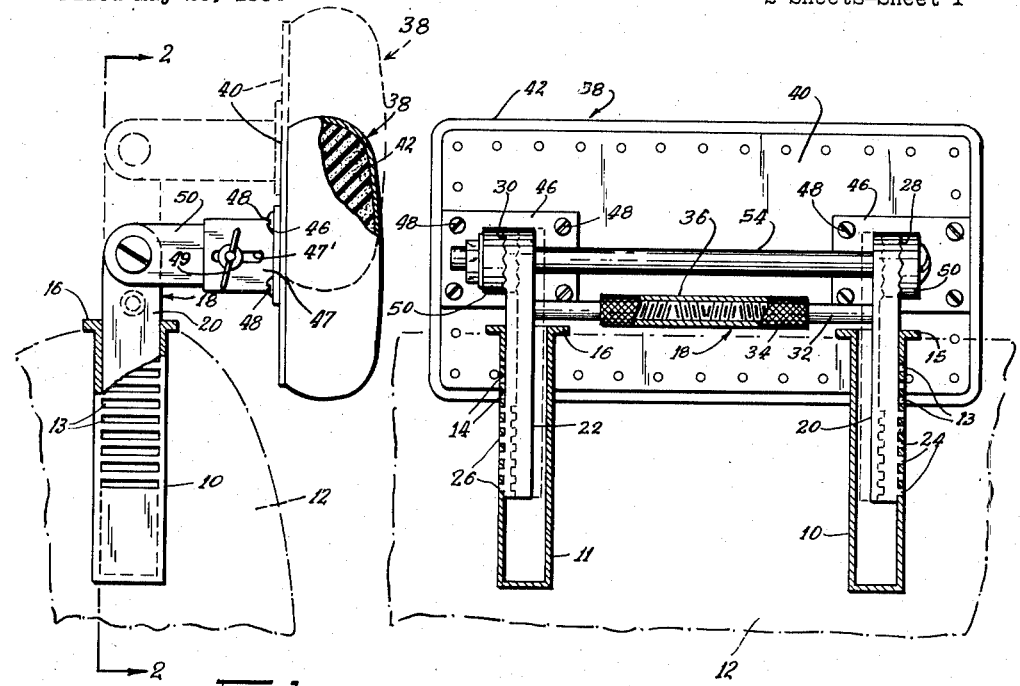
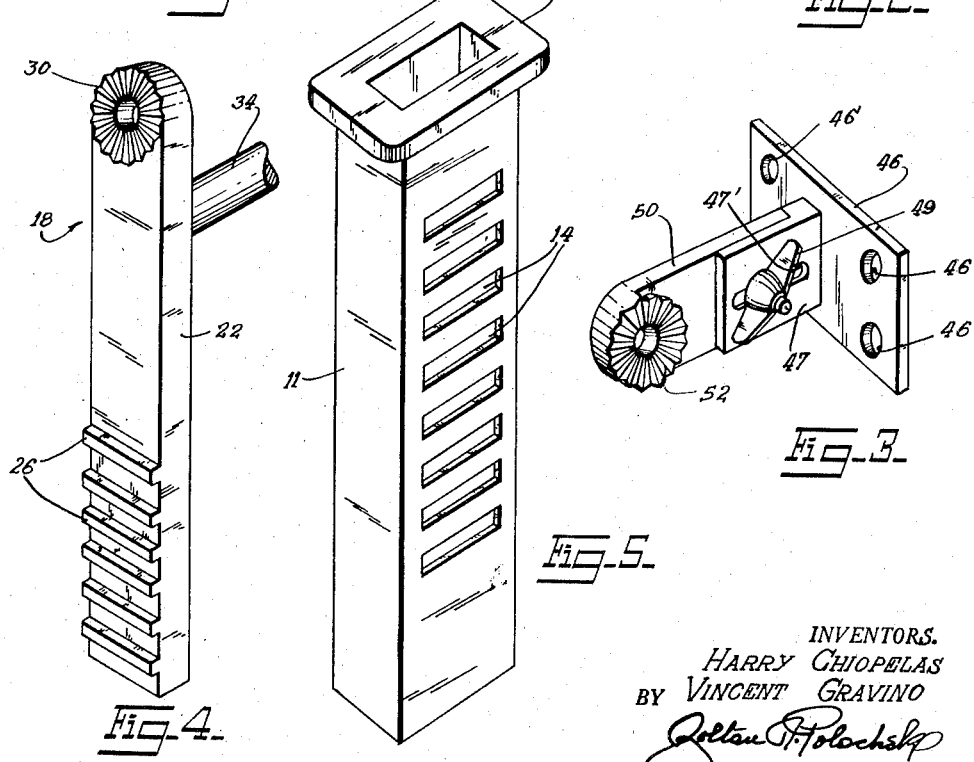
INVENTORS.
HARRY CHIOPELAS
BY VINCENT GRAVINO
ATTORNEY April 22, 1958   H. CHIOPELAS ET AL   2,831,530
AUTOMOBILE DRIVER'S HEADREST
Filed May 20, 1954   2 Sheets-Sheet 2
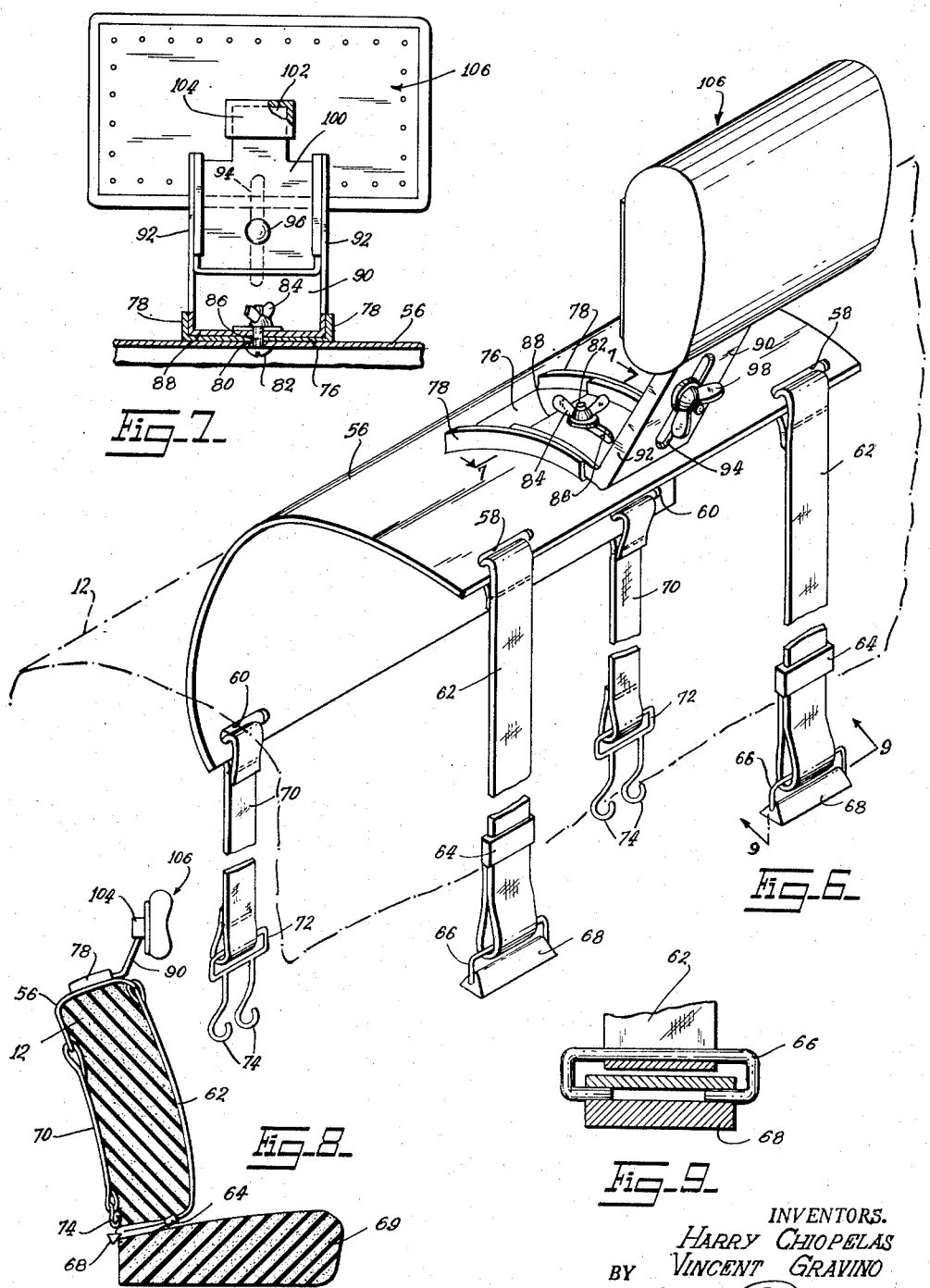
INVENTORS.
HARRY CHIOPELAS
BY VINCENT GRAVINO
ATTORNEY

United States Patent Office 2,831,530
Patented Apr. 22, 1958

2,831,530

AUTOMOBILE DRIVER'S HEADREST

Harry Chiopelas and Vincent Gravino, New York, N. Y.

Application May 20, 1954, Serial No. 431,201

1 Claim. (Cl. 155—177)

This invention relates to head rests. More particularly, the invention has reference to a head rest adapted to be removably supported upon the upper end of the back of an automobile seat, said head rest when supported on the seat back being adjustable upwardly and downwardly relative to the seat back, and also being adjustable in a second path in each of its positions of up and down adjustment, to comfortably fit against the head of the particular user.

While adjustable head rests for automobile seats are not new per se, it is proposed, in carrying out the objects of the present invention, to provide a generally improved head rest of the type stated. It is an important object of the present invention, in this connection, to so design the head rest as to facilitate its up and down adjustment, and its adjustment in a second path, thereby to provide a wide range of positions for the head rest, adapted to fit the needs of any one of a large number of persons.

Another important object of the present invention is to provide, in one form of the invention, improved means for simultaneously releasing the movable portions of the device for adjustment both vertically and to selected angular positions about a horizontal axis, said means normally locking the head rest against movement either vertically or about said horizontal axis, in each position of adjustment chosen therefor.

Another object of importance is to provide, in a second form of the invention, means facilitating the attachment of the device to a conventional seat, that will not require modification, redesigning, or other changes in the vehicle seat.

Still another object of importance is to provide, in the last-named form of the invention, a novel guide plate assembly that is particularly well adapted to facilitate the adjustment of the head rest both upwardly and downwardly, and in a fore-and-aft direction.

Yet another object of importance is to provide, in both forms of the invention, a relatively simplified construction, that will adapt the invention for manufacture at a comparatively low cost, considering the benefits to be obtained from the use thereof.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view, portions being broken away, of a head rest formed in accordance with the present invention, the dotted lines indicating one position to which the head rest may be adjusted, the associated vehicle seat being shown fragmentarily and in chain dotted outline.

Fig. 2 is a sectional view substantially on line 2—2 of Fig. 1.

Fig. 3 is an enlarged perspective view of one of the head rest brackets, per se.

Fig. 4 is an enlarged perspective view of one of the support standards per se, a portion of an associated connecting bar being shown.

Fig. 5 is an enlarged perspective view of one of the support sheaths per se.

Fig. 6 is a perspective view, an associated vehicle seat being shown fragmentarily and in chain-dotted outline, of a modified form of the invention.

Fig. 7 is a sectional view, substantially on line 7—7 of Fig. 6.

Fig. 8 is a transverse sectional view through a vehicle seat, on which the modified form of the invention has been mounted.

Fig. 9 is an enlarged, detail sectional view taken substantially on line 9—9 of Fig. 6.

The reference numerals 10 and 11 have been applied to identically but oppositely formed, generally vertically disposed support sheaths. These are of tubular formation, being open at their upper ends and closed at their lower ends, each sheath being of rectangular cross section. The sheaths are extended into upwardly opening, complementary recesses formed in the seat back 12 of the vehicle seat, the sheaths being fixedly mounted in said recesses in any suitable manner. Sheaths 10, 11 are respectively formed with a vertical series of transversely extending slots 13, 14. As will be noted, the slots of each sheath are formed in one of the side walls of the sheath, each slot extending fully from side to side of said side wall, with the slots being horizontally disposed in closely spaced relation for a substantial part of the length of the sheath.

At their upper ends, the sheaths 10, 11 are formed with peripheral, outwardly extended flanges 15, 16 respectively, constituting abutments engaging against the top edge of the vehicle seat.

A support frame has been designated generally by the reference numeral 18, and includes a pair of vertically disposed standards 20, 22 formed of solid bar stock of rectangular cross section. The standards 20, 22 are formed, on one face thereof, with teeth 24, 26, respectively, complementing the slots 13, 14.

As will be noted from Fig. 2, each standard is of reduced width as compared to the sheath into which it extends, thus to permit the standards to be shifted laterally within the sheaths from the full line positions thereof shown in Fig. 2, to the dotted line positions in said figure. When the standards are shifted inwardly toward one another to the Fig. 2 dotted line positions, the teeth 26 thereof will move out of the slots in which they were engaged, thus to permit vertical adjustment of the standards within the sheaths. After the standards have been adjusted vertically to a selected extent, they can be moved outwardly once again to their full line positions of Fig. 2, to be lockingly engaged in the selected positions of vertical adjustment.

In Fig. 2, the standards are illustrated in their lowest position of vertical adjustment, and will be noted that they can be adjusted upwardly until the uppermost tooth 26 engages in the uppermost slot, this being the limit of adjustment in an upward direction.

On their upper ends, the standards are formed with outwardly facing radially disposed clutch teeth 28, 30, said teeth of each standard radiating outwardly from a smooth-walled opening formed in the upper end of the standard, the openings in the upper ends of the standards being aligned horizontally, for a purpose to be made presently apparent.

Fixedly secured to the inner faces of the upwardly projecting portions of the standards are connecting bars 32, 34, said bars being coaxially aligned and extending toward one another. At their inner ends, the bars are spaced apart as shown in Fig. 2, and are oppositely threaded, the oppositely threaded inner ends of the bars being threadedly engaged in complementary, oppositely threaded end portions of the bore of an adjusting sleeve 36 having a knurled outer surface to facilitate manual rotation thereof.

By reason of the construction illustrated, the sleeve 36, when turned in one direction, will shift the standards in a horizontal direction toward one another, to the dotted line positions shown in Fig. 2, thus to disengage the teeth 24, 26 of the standards from the slots 13, 14, respectively, for the purpose of permitting vertical adjustment of the standards. When the standards have been positioned in their new positions of vertical adjustment, the sleeve 36 is turned in an opposite direction, thus causing the standards to move outwardly into locking engagement with the associated sheaths, as shown in full lines in Fig. 2.

A head rest assembly has been designated generally by the reference numeral 38, and includes a rectangular, relatively elongated back plate 40, the back plate 40 being of metal material or the like, and being flat over its full area. Secured to the back plate 40 and projecting forwardly therefrom is a cushion 42, the cushion being transversely indented as shown in Fig. 1, with the indentation extending horizontally from end to end of the cushion. The cushion can be formed of any suitable material, but preferably, is formed of foam rubber covered with leatherette or plastic, the peripheral portion of the plastic being tucked under the foam rubber and being interposed between the foam rubber and the peripheral portion of the plate 40. Thereafter, nails 44 or similar fastening elements are extended through the plate into the pad, throughout the periphery of the plate, to complete the construction of the head rest assembly.

Carried by and projected rearwardly from the back plate 40, are bracket plates 46, said bracket plates 46 being formed with rectangularly spaced apertures 46' receiving screws or similar fastening elements 48 whereby the plates are fixedly connected to the opposite end portions of the backing plate 40. Rigid with the midlength portion of each plate 46 is a rearwardly projecting arm 47 formed with longitudinal slot 47' adapted to be slidingly engaged by a thumb screw 49 projecting from and threadedly engaging into a sliding arm 50. This arrangement will permit horizontal adjustment of the headrest assembly 38. The sliding arms 50 of the respective bracket plates having clutch teeth 52 complementing the teeth 28, 30 of the standards. The sliding arms 50 embrace the supporting frame 18 between them, with the rearwardly disposed free end portions of the arms being in engagement with the toothed outer faces of the upwardly projecting portions of the standards.

The arms 50 are formed with smooth-walled openings aligned with the openings of the standards, and extending through the several registering openings is an elongated pivot bolt 54. The pivot bolt 54 is provided with a head at one end engaging against one of the arms 50, the other end of the pivot bolt being threaded to receive a nut engaging against the other arm 50. In this way, the head rest assembly is swingable about a horizontal axis represented by the pivot bolt, in each position to which the head rest assembly is vertically adjusted in the manner previously described.

It will be observed that when the sleeve 36 is turned in a direction to shift the standards inwardly to the dotted line positions, that is, to the unlocked position of the standards, said rotation of the sleeve will at the same time unlock the head rest assembly relative to the standards, thereby causing the supporting frame 18 to be freed for vertical adjustment, simultaneously with freeing of the head rest assembly for adjustment in an arcuate path about the horizontal axis represented by the pivot bolt 54. Either or both adjustments may now be made and when the head rest assembly has been positioned at the location desired, rotation of the sleeve 36 in an opposite direction will simultaneously lock the standards in engagement with the sheaths, and will lock the arms of the head rest assembly in engagement with the standards.

In Fig. 6 there is illustrated a modified form of the invention, adapted for mounting on a vehicle seat without the necessity of forming recesses in the seat. In this form of the invention, there is included a transversely curved plate 56 proportioned to fit over the top and the upper part of the back surface of a conventional vehicle seat back 12.

As will be noted from Figs. 6 and 8, the front edge portion of the metal plate 56 overlies the top surface of the seat, while the rear edge portion of the plate 56 is curved downwardly to contact the back surface of the seat at the upper end of said seat.

At opposite ends of the leading edge portion of the plate 56, elongated slots 58 are formed, while slots 60 are similarly located adjacent the back edge of the plate.

Extending through the slots 58 are the upper ends of widely spaced elongated flexible straps 62 of canvas webbing or the like, said upper ends of straps 62 being stitched after being passed through the slots 58, as best shown in Fig. 6.

Straps 62, at their lower ends, are provided with buckles 64, forming loops at the lower ends of the straps, said loops being adjustable to adjust the overall length of the straps. In the loops there are engaged connecting elements 66 (Fig. 9), said elements being formed of wire material the ends of which are bent inwardly toward one another to engage loosely in the opposite ends of the bore of a block 68. Block 68 may be formed of wooden material, or molded plastic, and is of triangular cross section, as best shown in Fig. 6.

The purpose of the construction described immediately above is to facilitate the insertion of the blocks 68 between the seat back 12 and the bottom portion 69 of the vehicle seat, thus to engage the front edge portion of the plate 56 tightly against the vehicle seat. This is shown in Fig. 8, and as will be noted from this figure of the drawings, means is also provided to hold the back edge portion of the plate 56 in tight engagement with the surface of the seat back.

The last-named means includes elongated, depending, flexible straps 70 secured at their upper ends within the slots 60, and provided at their lower ends with loops receiving eyelets 72. Eyelets 72 are of wire material, and integral with said eyelets are depending hooks 74, a pair of hooks 74 being provided on each eyelet 72. Hooks 74 are adapted to engage under the bottom edge of the seat back as shown in Fig. 8.

It will be seen that in the manner described above, the plate 56 is secured fixedly to the seat back, without the necessity of modifying or redesigning the seat back in any way. Further, the construction is such as to facilitate the swift connection of the device to the seat back, and to facilitate in an equally advantageous manner the disconnection of said device from the seat back whenever the device is not to be used.

Welded to the midlength portion of the plate 56 is a base plate 76, said base plate extending in a fore-and-aft direction and being formed at opposite side edges thereof with upstanding guide flanges 78. The plate 76 follows a transverse curvature of the plate 56, as best shown in Fig. 6.

Referring to Fig. 7, intermediate the opposite ends of the base plate 76 there is formed therein an opening 80, and extending upwardly through said opening 80 is a clamping bolt 82, having at its upwardly projecting end a wing nut 84. Bolt 82 extends through an elongated slot 86 (Fig. 6) formed in a movable plate 88, the plate 88 being longitudinally curved conformably to the base plate, and being supported upon the base plate for movement in a fore-and-aft direction. Plate 88, at its opposite sides, has upstanding guide flanges embraced by the guide flanges 78 of the plate 76.

It will be seen that the plate 88 can be adjusted through an arcuate path upon the plate 76, and in each position of adjustment can be fixedly secured against movement by means of the bolt and wing nut.

Formed upon the leading edge of the movable plate is an upwardly extending, inclined extension 90, the extension 90 having side walls 92 formed as continuations of the side walls or flanges of the plate 88. Extension 90 is formed, intermediate its ends, with a longitudinal slot 94, and extending through said slot is a bolt 96 provided with a wing nut 98. Bolt 96 extends through a circular opening formed in a head rest support plate 100. Plate 100 is provided with side flanges embraced between the flanges 92 of the extension 90 (Fig. 7), the plate 100 being adjustable upwardly and downwardly upon the extension 90 within a path inclined from the vertical, said path being determined by the angularity which the extension 90 bears to the vertical.

Upon the upper end of the plate 100 there is formed a tongue 102 of reduced width, said tongue being removably engaged in a downwardly opening socket plate 104 secured fixedly to the back of a head rest assembly 106. The head rest assembly will not be described in detail, since it is formed like the head rest assembly 38 of the first form.

It will be seen that the head rest assembly can be removed bodily by being lifted off the tongue 102, whenever it is not desired to use the same. Further, the movable plate 88 and its integral extension 90 can also be removed bodily by removal of the wing nuts 84, 98, whenever the device is not to be used. Under ordinary circumstances, however, the device would, in use, be adjustable in a fore-and-aft direction by loosening of the wing nut 84. Further, in each position to which the device is adjusted through an arcuate path in said fore-and-aft direction, the head rest assembly can be adjusted upwardly and downwardly along a path inclined from the vertical, upon the extension 90, by loosening of the wing nut 98.

In this way, a wide range of adjustments is obtained, to permit the head rest to be fitted comfortably to the head of the particular user.

It is to be understood that instead of a pair of standards 20, 22 only one may be used for raising and lowering the head rest assembly 38. In this arrangement the standard may be raised and lowered by a suitable swivel arrangement.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new, and desire to secure by United States Letters Patent is:

A headrest attachment for a vehicle seat back, comprising a generally rectangular elongated transversely curved plate shaped to fit over the top and upper part of the back surface of said seat back, the outermost corners of the plate having longitudinal slots formed therein, a plurality of widely spaced elongated flexible straps having opposite looped ends, one end of each strap being looped through one of the slots respectively, block members pivotally secured in the free looped ends of the straps secured to the leading edge portion of the plate, said block members being adapted to engage between the bottom and back of said seat, hook members pivotally secured in the free looped ends of the spaced straps secured to the rear edge portion of the plate, said hook members being adapted to engage under the bottom edge of the seat back at the rear thereof, a base plate welded to a midlength portion of the curved plate and extending in a fore and aft direction thereon, said base plate having lateral upstanding guide flanges formed thereon, said base plate and flanges having curvatures corresponding to the curvature of the curved plate, a bolt extending through the curved plate and provided with a wing nut, a movable plate having upstanding lateral flanged ends disposed on the base plate and guided for movement in an arcuate path by the guide flanges on the base plate, said movable plate having an arcuate slot therein, said bolt extending through said slot in the movable plate with said wing nut providing means for clamping the movable plate in selected fore and aft positions on the base plate, an upwardly extending inclined extension plate formed integral with said movable plate, said extension plate having reinforcing side walls formed as extensions of the side flanges on the movable plate, a generally rectangular headrest plate movably disposed on said extension plate and guided in movement thereon by the side walls of said extension plate, said extension plate having a slot therein, another bolt extending through the slot in the extension plate and an aperture in the headrest plate, another wing nut threaded on said other bolt and serving as a clamping means for positioning said headrest plate in selected positions on the extension plate, and a resilient headrest member secured to the headrest plate in an elevated position over said rectangular curved plate.

References Cited in the file of this patent

UNITED STATES PATENTS

| | | |
|---|---|---|
| 1,744,364 | Cruickshank | Jan. 21, 1930 |
| 2,490,088 | Penn | Dec. 6, 1949 |
| 2,560,925 | Brown | July 17, 1951 |
| 2,624,397 | Aubin | Jan. 6, 1953 |
| 2,652,101 | Samsky | Sept. 15, 1953 |